(12) United States Patent
Speranza

(10) Patent No.: US 7,552,622 B2
(45) Date of Patent: Jun. 30, 2009

(54) SYSTEM FOR MONITORING THE HEALTH OF ELECTRICAL GENERATORS AND METHOD THEREOF

(75) Inventor: A. John Speranza, West Hartford, CT (US)

(73) Assignee: Proton Energy Systems, Wallingford, CT (US)

( * ) Notice: Subject to any disclaimer, the term of this patent is extended or adjusted under 35 U.S.C. 154(b) by 44 days.

(21) Appl. No.: 11/764,885

(22) Filed: Jun. 19, 2007

(65) Prior Publication Data

US 2008/0148818 A1 Jun. 26, 2008

Related U.S. Application Data

(63) Continuation of application No. 10/994,772, filed on Nov. 22, 2004, now abandoned, which is a continuation-in-part of application No. 10/711,395, filed on Sep. 16, 2004.

(51) Int. Cl.
*G01M 3/00* (2006.01)
(52) U.S. Cl. .................................. 73/40.5 R; 73/40
(58) Field of Classification Search ............ 73/40, 73/40.5 R
See application file for complete search history.

(56) References Cited

U.S. PATENT DOCUMENTS

| | | | | |
|---|---|---|---|---|
| 4,406,163 A | * | 9/1983 | Lofink | 73/274 |
| 4,440,017 A | * | 4/1984 | Barton et al. | 73/40.5 R |
| 4,959,569 A | * | 9/1990 | Snuttjer et al. | 310/53 |
| 5,363,693 A | * | 11/1994 | Nevruz | 73/40.5 R |
| 5,510,201 A | | 4/1996 | Werth | |
| 5,929,324 A | | 7/1999 | Hu et al. | 73/40 |
| 6,305,442 B1 | | 10/2001 | Ovshinsky et al. | |
| 6,524,464 B2 | | 2/2003 | Dubey, Jr. | 205/335 |
| 6,841,046 B2 | | 1/2005 | Puthawala et al. | |
| 2003/0009164 A1 | | 1/2003 | Woloszko et al. | |

FOREIGN PATENT DOCUMENTS

JP 1995231610 A 8/1995

* cited by examiner

*Primary Examiner*—Daniel S Larkin
(74) *Attorney, Agent, or Firm*—Cantor Colburn LLP

(57) ABSTRACT

A method and apparatus is provided for a system for maintaining hydrogen purity in an electrical power generator where the system monitors the health of the electrical generating system by calculating the time remaining until preventative maintenance is required based on hydrogen usage. The system also monitors the health of the system by detecting the occurrence of major leaks within the electrical power generator and adapting the operation of the system to maintain a desired operating environment.

17 Claims, 10 Drawing Sheets

SYSTEM FOR MONITORING THE HEALTH OF ELECTRICAL GENERATORS AND METHOD THEREOF

CROSS REFERENCE TO RELATED APPLICATIONS

This application is a continuation application of U.S. patent application Ser. No. 10/994,772 filed Nov. 22, 2004, now abandoned, which is a continuation-in-part application of U.S. patent application Ser. No. 10/711,395 filed Sep. 16, 2004, both of which are incorporated herein by reference in their entirety.

FIELD OF INVENTION

This disclosure relates generally to electrical generator systems and especially to electrical generators utilizing hydrogen gas to cool the generator.

BACKGROUND OF THE INVENTION

Modern electrical power plants often utilize turbine generators to produce electricity. During operation, these generators produce large amounts of heat which must be dissipated in order for the generators to operate at maximum efficiency. Traditionally, air was used as a cooling medium to help dissipate the heat. However, as generator capacity and size increased, hydrogen replaced air due to its high heat capacity and low density. Additionally, the use of hydrogen reduces the windage or friction losses over comparably sized air cooled units.

Due to the loss in efficiency from windage, it is desirable to maintain as high a purity level of the hydrogen in the generator. As shown in FIG. 1, as the windage loss increases due to impurities, the financial loss to the power plant correspondingly increases. For a 800MW generator, an 8% decrease in the purity of the hydrogen in the generator increases the cost of producing electricity by almost $4000 per day. Accordingly, it is desirable to maintain as high a level of purity as possible.

While the generator is in operation, hydrogen is continuously lost due to leaks in seals. Traditionally, to maintain the appropriate level of pressure and purity in the generator, the power plant operator would purchase hydrogen gas in bulk from gas producers who delivered the gas in cylinders or by tanker truck. The operator would periodically check the purity level and add hydrogen from the hydrogen gas cylinders as needed.

As an alternative to using bulk purchased hydrogen gas, power plant operators have also used electrolysis gas generators which allow the operator to produce hydrogen gas on-site. The electrolysis generators use electricity to split water into hydrogen and oxygen gas. The use of electrolysis typically reduced the cost of using hydrogen and also reduced the security concerns of the power plants in having to receive and store large quantities of a flammable gas. Typically, however, the electrolysis generators which are economically viable for providing makeup gas for the electrical generator lacked the capacity to produce sufficient volumes of hydrogen to quickly purge or fill the electrical generator after it had been shut down for maintenance. Also, plant operators still relied on manual filling of the generators which did not allow for optimal efficiencies.

Accordingly, what is needed in the art is a system for maintaining high purity levels of hydrogen in an electrical power generator and for providing a means for utilizing an on-site hydrogen generator to produce sufficient hydrogen to purge or fill the electrical power generator.

SUMMARY OF THE INVENTION

A method and apparatus is provided for a system for maintaining hydrogen purity in an electrical power generator. The method and apparatus are also provided for determining when preventative maintenance is required or if a major leak is formed in the electrical power generator. The purity system includes: a generator, a hydrogen generator configured to provide hydrogen gas to the generator, a purity monitor for detecting the level of hydrogen purity in the generator and providing a signal when the purity drops below a predetermined threshold. The system automatically compensates for gas loss or contamination to maintain the desired level of efficiency in the electrical generator.

A method for determining a hydrogen leak in an electrical generator is also provided by first measuring a first hydrogen flow rate. The method then measures a second hydrogen flow rate and determines a first rate of change of hydrogen flow from the first and second hydrogen flow rates. In response to the first rate of change of hydrogen flow exceeding a predetermined value the method will generate an alarm signal.

A method for determining a preventative maintenance schedule in an electrical generator is also provided. This method measures a first hydrogen flow rate and a second hydrogen flow rate. A first rate of change of hydrogen flow is determined from the first and second hydrogen flow rates. A first time value is then determined where the first time value represents the amount of time remaining until preventative maintenance is required.

In another alternate embodiment, a computer readable medium having computer executable instructions for performing a method for monitoring the operation of a hydrogen cooled electrical generator is provided. The method receives a first signal representative of the rate of hydrogen gas flow to an electrical generator. A rate of change of hydrogen gas flow from said first signal is determined and a second signal is generated if the rate of change of hydrogen gas flow exceeds a predetermined value. Also, a third signal representing operating time remaining until preventative maintenance is required may be generated.

The above discussed and other features will be appreciated and understood by those skilled in the art from the following detailed description and drawings.

BRIEF DESCRIPTION OF THE DRAWINGS

Referring now to the drawings, which are meant to be exemplary and not limiting, and wherein like elements are numbered alike.

DESCRIPTION OF PREFERRED EMBODIMENT

As the demand for power by consumers has increased, electrical power producers have increasingly turned to larger generators to fulfill the needs of society. As the size of the generators increased, it became increasingly more difficult to maintain the generator at an appropriate operating temperature to prevent damage to the generator components. Smaller generators relied on air cooling to dissipate heat from the generator rotor windings. To improve heat transfer, generator manufacturers began to utilize hydrogen gas as a transfer agent since the thermal conductivity of hydrogen is seven times that of air.

Figure 1:
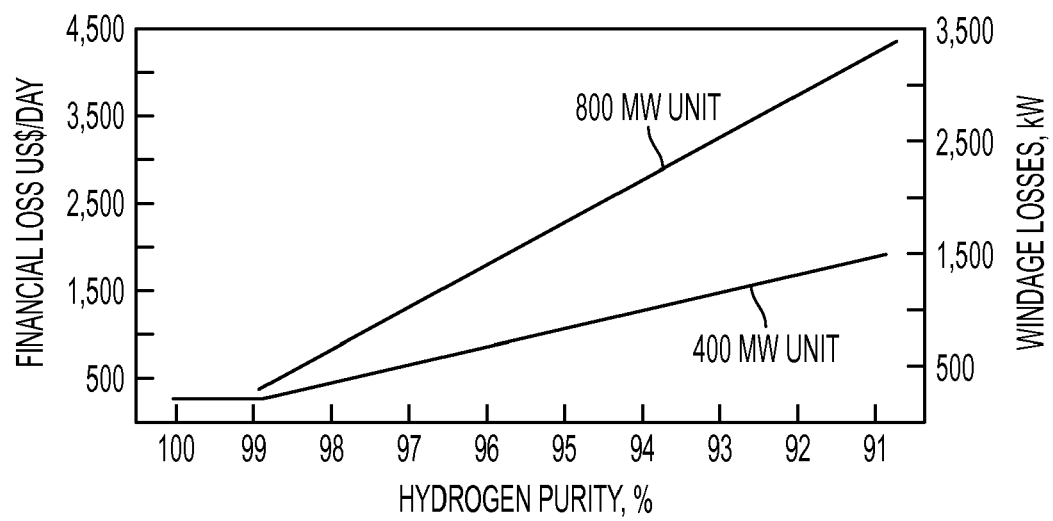
FIG. 1 is a graphical plot illustrating the windage losses as a function of hydrogen purity.

The switch to hydrogen also yielded side benefits by reducing the windage losses in the generator due to hydrogen's lower density. As shown in FIG. 1, the higher purity level of the hydrogen gas in the generator, the lower the windage losses. However, since the generator contains various components, such as seals which must be lubricated, contaminants such as water and oil become mixed with the gas reducing the purity levels. To compensate for these contaminants, operators utilized purifying systems 22, such as a heated regenerative dryer, which allowed removal of water from the generator without having to purge the generator of a costly gas.

In addition to contamination, operators must cope with hydrogen leaks which typically occur at the generators seals. As hydrogen escapes, the operator must add make-up hydrogen gas to the generator in order to maintain the heat transfer and low windage benefits. In a typical generator such as a GE Frame-7 generator, the loss of hydrogen and the amount of hydrogen can reach up to 20-40 cubic feet of hydrogen per hour.

Figure 2:
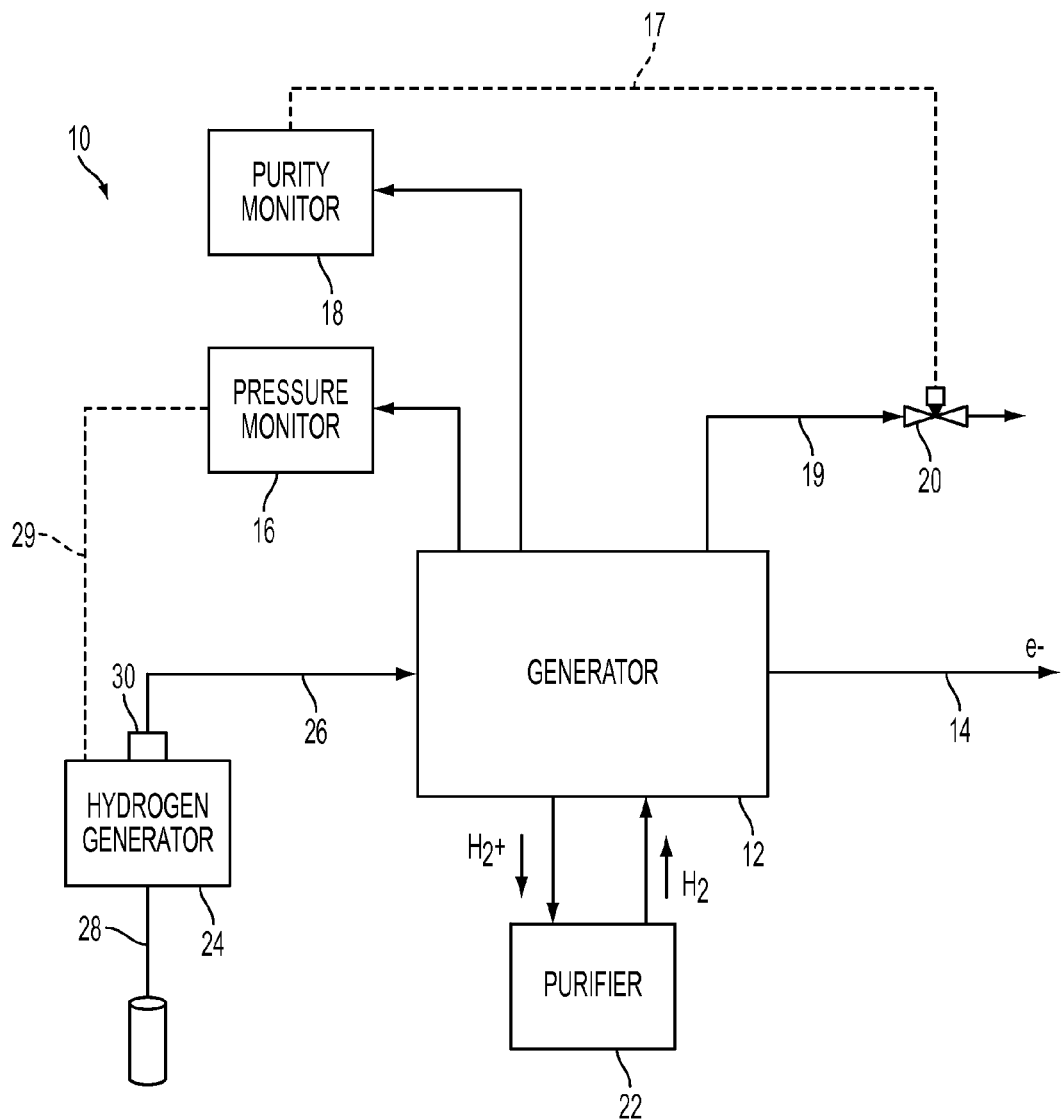
FIG. 2 is a schematic diagram illustrating the hydrogen purity system of the present invention.

An exemplary embodiment of the present invention is shown in FIG. 2. The generator system 10 includes a generator 12 which may be driven by any conventional means, such as a steam turbine (not shown). The generator 12 produces electricity which is transmitted to the utility grid 14. The pressure inside the generator is monitored by a pressure monitor 16 and the purity of the hydrogen gas inside the generator is monitored by a monitor 18. As will be described in more detail herein, the purity monitor may be of any suitable type capable, such as but not limited to a thermal conductivity analyzer or a vibrating element analyzer.

The generator 12 also includes a vent line 19 which connects to a solenoid valve 20. The outlet of the valve 20 leads to a vent which allows the hydrogen gas to be properly dissipated into the atmosphere. As will be described in more detail herein, a communications link 17 connects the purity monitor 18 with the solenoid valve 20. A hydrogen generator 24 provides hydrogen gas to the generator 12 through conduit 26. Alternatively, a controller (not shown) in the generator 12 controls the solenoid valve 20 to vent the hydrogen gas. Alternatively, the a controller (not shown) in the generator 12 controls the solenoid valve 20 to vent the hydrogen gas.

In the preferred embodiment, the hydrogen generator will include a water-fed electrochemical cell which is capable of disassociating reactant water into hydrogen and oxygen gas. Suitable reactant water is de-ionized, distilled water, which is continuously supplied from a water source 28. The electrochemical cell will preferably be of a polymer electrode membrane (PEM) type. The electrochemical cell may also be any other suitable electrochemical cell such as, but not limited to, alkaline, phosphoric acid, or solid oxide based cells. The hydrogen generator 24 may also be any non-electrochemical system capable of producing hydrogen gas such as, but not limited to, a steam methane, or natural gas reformation.

An output sensor 30 is incorporated into the hydrogen generator 24 to sense the differential pressure between the hydrogen generator 24 and the conduit 26. The output sensor 30 may be a pressure transducer that converts gas pressure within the conduit 26 to a voltage or current level indicative of the gas pressure. Output sensor 30 may also be any other sensor suitable for sensing a qualitative or quantitative parameter of the gas and provide an electrical signal indicative of that parameter as an output. Such other sensors include, but are not limited to, a flow rate sensor, a mass flow sensor, and a differential pressure sensor. Optionally, a feedback signal 29 may be provided from the pressure monitor 16 to the hydrogen generator 24.

Output sensor 30 interfaces with a controller (not shown) that is capable of converting the analog voltage or current level provided by the sensor 30 into a digital signal indicative of the sensed hydrogen pressure. The controller compares the sensed hydrogen pressure to a predetermined parameter for controlling the output of the hydrogen generator 24 as will be described in more detail herein.

Figure 3:
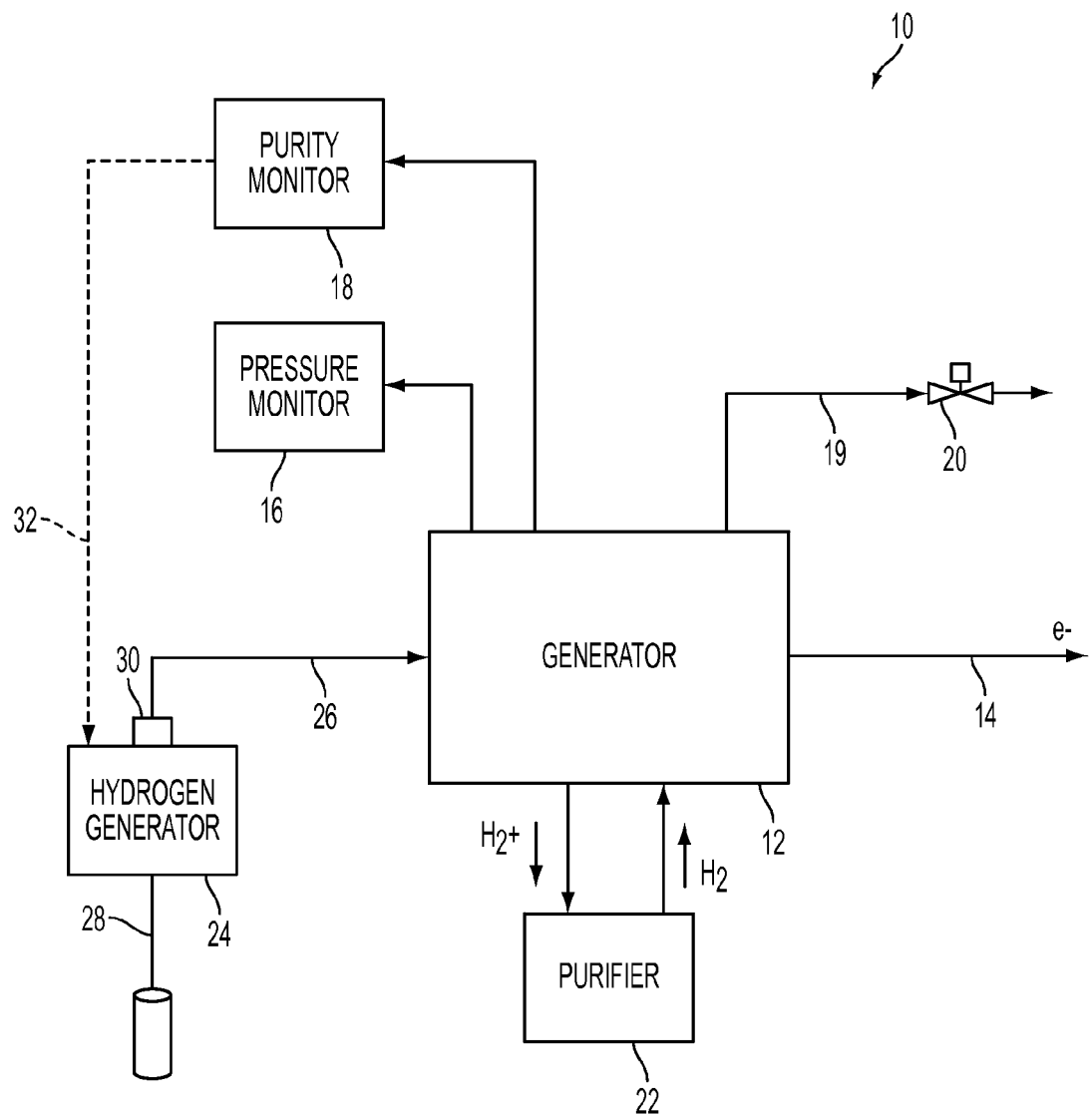
FIG. 3 is a schematic diagram illustrating an alternate embodiment hydrogen purity system of the present invention.

An alternate embodiment of the electrical power generating system 10 is shown in FIG. 3. In this embodiment, the purity monitor 18 is electrically coupled to the electrolyzer 24 by line 32 to provide a control signal when the hydrogen gas purity level drops below a predetermined threshold.

Electrical power generators hold a large volume of hydrogen gas, typically at least 7,500 cubic feet. Consequently, at an event where the generator needs to be purged and filled with hydrogen gas, such as at startup, or after maintenance, the operator will need access to a large volume of hydrogen gas. Events such as startup or maintenance purging typically occur on an annual basis. Since a hydrogen generator capable of generating this volume of hydrogen in a short period of time would be greatly over-sized for daily operation. Accordingly, it is desirable to have a means for storing excess hydrogen gas generated by the hydrogen generator 24. In the embodiment shown in FIG. 4, the hydrogen generator has a first conduit 26 and a valve 27 which provides hydrogen to the generator 12 as described herein above. The hydrogen generator 24 further includes a second conduit 34 and a valve 36 which fluidly couples the hydrogen generator to at least one storage tank 40. The system 10 may also optionally include a solenoid valve 36 and a compressor 38 coupled to the conduit 34. An optional pressure transducer 42 may be electrically coupled to the valve 36 to terminate filling of the tank 40 once a desired pressure level is reached. The compressor may be any suitable type, such as but not limited to a metal hydride compressor, an electrochemical compressor, or a mechanical compressor. The compressor 38 is shown external to the hydrogen generator 24 for exemplary purposes, preferably, the compressor may be integrated with the hydrogen generator 24. A conduit 46 fluidly couples the tank 40 with the generator 12. A valve 48 controls flow from the tank to the generator 12.

As discussed above, electrical power generators are large apparatus which hold a large volume of gas. In prior art systems which utilized cylinder or tube trailer delivered hydrogen gas containers, a manual shut-off valve was placed between the gas cylinders. This valve prevented the flow of hydrogen into the generator and preventing the discharging of gas into the facility in the event that a major leak occurred in the generator. Accordingly, as described above the hydrogen purity level in prior art systems would continue to drop until the operator manually opened the shut-off valve to refill the generator.

Figure 8:
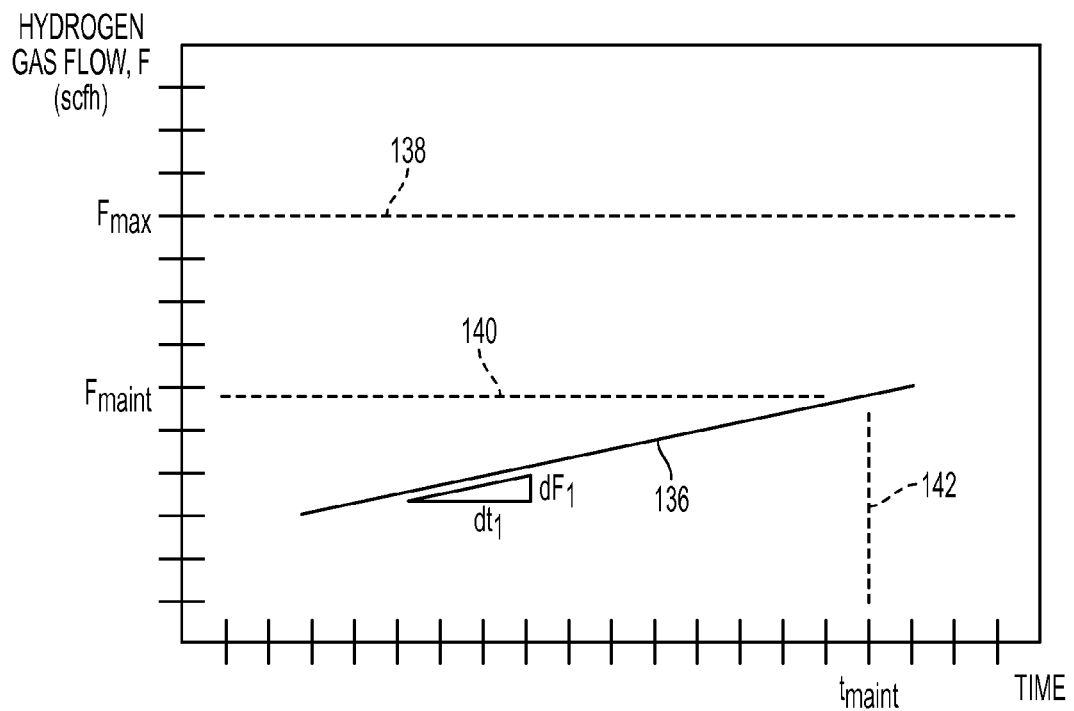
FIG. 8 is a diagram illustrating hydrogen flow usage over time under normal operating conditions.

FIG. 8 shows typical hydrogen usage expected with the generator system 10. The hydrogen starts at an initial flow $F_{initial}$. If preventative maintenance has been performed on the generator 12, $F_{initial}$ should be at the lowest flow achievable in a generator system 10. Due to small leaks in the generator 12, the hydrogen flow rate from the hydrogen generator 12 will increase and the line 136 will have a positive slope $dF1/dt1$. During the course of normal operation the amount of hydrogen flow F to the generator 12 will gradually increase until it reaches a predetermined flow $F_{maint}$ 140 which corresponds to the maximum flow rate that the operator desires before removing the generator system 12 from operation for maintenance. The flow $F_{maint}$ 140 may be chosen by the operator depending on a number of factors, such as but not limited to: time, electrical power demand, cost to maintain or generator efficiency. While the hydrogen flow line 136 is shown as a straight line, however, depending on the individual generator, the line 136 may be straight, or follow another profile. By capturing the information of line 136 this allows the trending of the hydrogen flow F to allow the operator to determine at what time $t_{maint}$ 142 in the future maintenance will be required. By being able to predict the time $t_{maint}$ 142, the operator will be able to make more effective utilization of the generator 12. In this manner, the operator may chose to remove the generator system 10 from service at a convenient time and not at a peak demand time. For example, if the time $t_{maint}$ 142 is predicted to occur during a peak electrical demand period (August), the operator may chose to perform the maintenance early (May) so that the system 10 is producing electricity at maximum efficiency, or hold off on maintenance until after the peak season (September) and be prepared to rely on increased hydrogen usage to maintain appropriate levels of operation.

The system 10 will also have a maximum hydrogen flow $F_{max}$ 138 which corresponds to the maximum hydrogen flow the hydrogen generator 24 may produce. In the preferred embodiment, the maximum hydrogen flow $F_{max}$ 138 will be determined by the ventilation system in the facility where the generator system 10 is located. By providing adequate ventilation, even if the maximum hydrogen flow $F_{max}$ 138 is released into the facility, appropriate operating conditions will still exist. This allow the elimination of the need for the manual shut-off valve used in the prior art discussed above and allows the hydrogen generator 24 to be continuous operating and connected to the generator 12.

Figure 9:
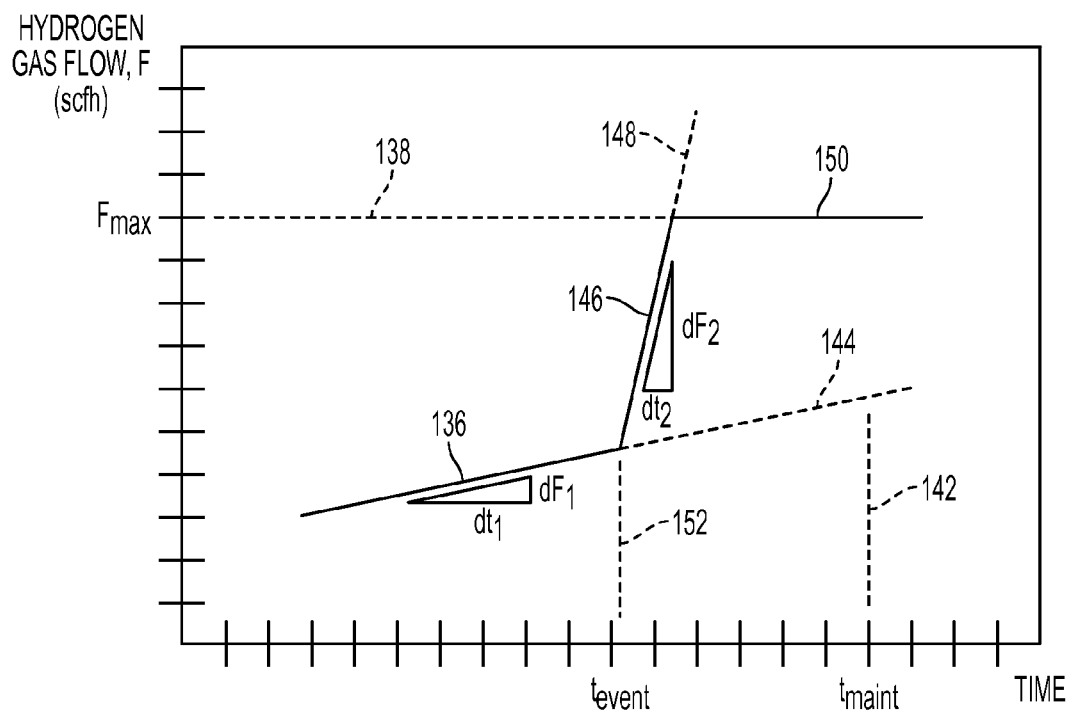
FIG. 9 is a diagram illustrating hydrogen flow usage over time in the event of a major seal leak in the electrical generator.

Trending the hydrogen flow F also provides additional advantages in maintaining safe operation of the generator system 10 as shown in FIG. 9. If the generator 12 is operating normally, the hydrogen flow will trend as shown in line 136, continuing on to line 144 until the time for maintenance $t_{maint}$ 142 is reached. However, if a component, such as a seal in the generator 12 fails, at a time $t_{event}$ 152, the pressure will drop in the generator 12 causing the hydrogen generator 24 to increase its hydrogen gas output to compensate. This series of events will result in a notable increase in hydrogen flow F as shown by line 146 which will have slope $dF_2/dt_2$. Depending on the nature of the event, the hydrogen flow would continue to increase from line 146 to line 148. However, since the hydrogen generator 24 will have a maximum hydrogen flow $F_{max}$ 138, the hydrogen flow will transition from line 146 to line 150 when the hydrogen flow $F_{max}$ 138 is reached.

As will be described in more detail below, by trending the hydrogen flow, the component failure resulting in the hydrogen leakage may be detected and the system may take a predetermined action, such as but not limited to sounding an alarm or disabling the system. Alternatively, by being immediately notified of a potential component failure, the operator will have more time to investigate the cause of the increased hydrogen flow and adjust the operation of the generator system 10 as appropriate.

FIGS. 5, 6, 7, 10 and 11 are flow diagrams depicting the operation of the generating system 10. These methods may be included and executed in the controller application code in one or more of the individual components of the system 10, or may be embodied in a single central controller (not shown). These methods are embodied in computer instructions written to be executed by a microprocessor typically in the form of software. The software can be encoded in any language, including, but not limited to, assembly language, VHDL (Verilog Hardware Description Language), VHSIC HDL (Very High Speed IC Hardware Description Language), Fortran (formula translation), C, C++, Visual C++, Java, ALGOL (algorithmic language), BASIC (beginners all-purpose symbolic instruction code), visual BASIC, ActiveX, HTML (Hyper-Text Markup Language), and any combination or derivative of at least one of the foregoing. Additionally, an operator can use an existing software application such as a spreadsheet or database and correlate various components enumerated in the algorithms. Furthermore, the software can be independent of other software or dependent upon other software, such as in the form of integrated software.

Figure 5:
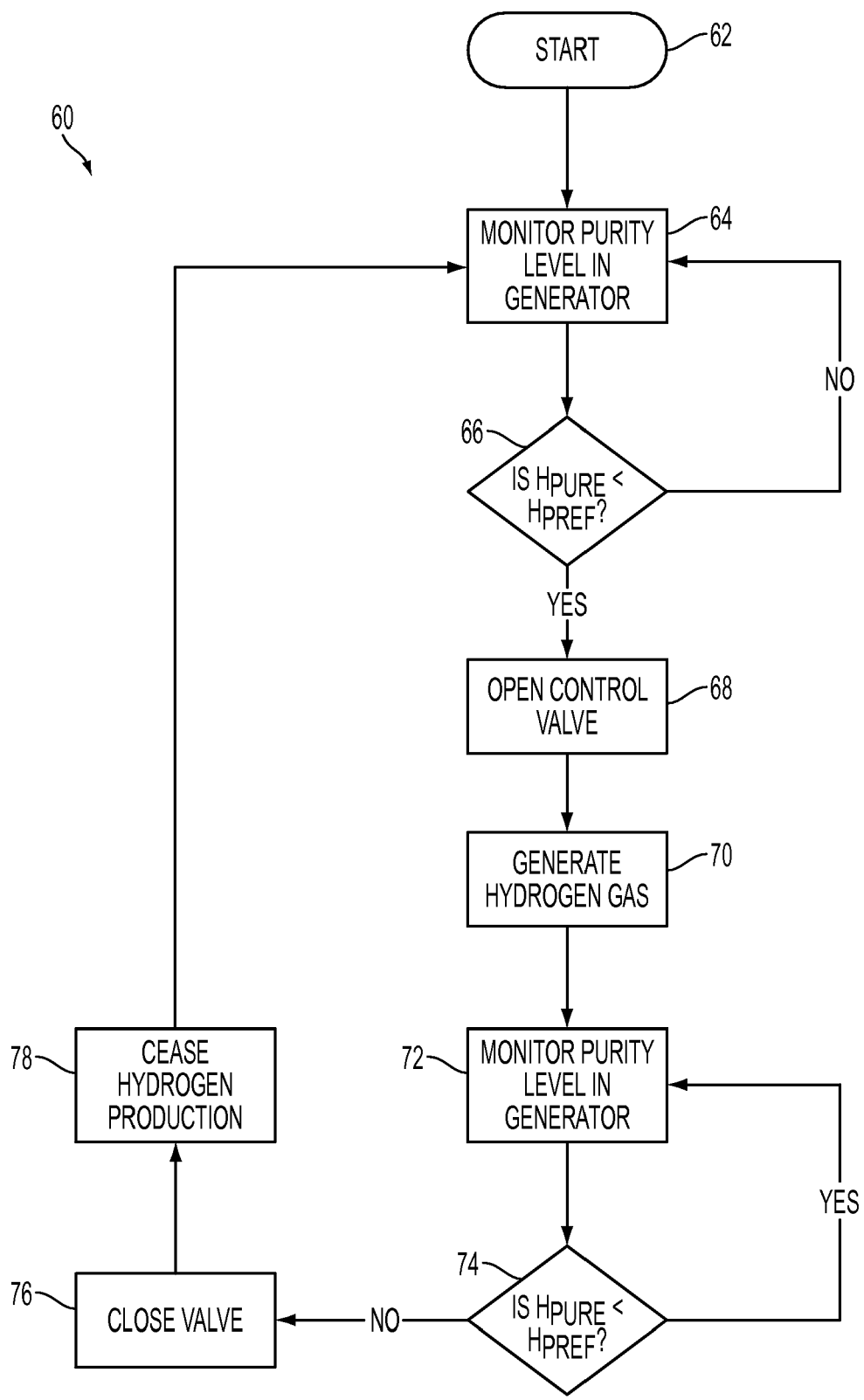
FIG. 5 is a block flow diagram illustrating the method of operating the system of FIG. 2.

Referring to FIGS. 2 and 5 an electrical power generating system control method 60 of FIG. 5 will now be described. Method 60 starts at block 62 and proceeds to block 64. At block 64, the purity monitor 18 samples hydrogen from the generator 12 to determine a value $H_{pure}$ indicative of the level of hydrogen purity in the sampled gas. Method 60 then proceeds to block 66, where the purity level $H_{pure}$ is compared with a desired level $H_{pref}$. The parameter $H_{pref}$ represents the purity level desired by the operator and allows the operator to balance efficiency requirements with hydrogen usage. Alternatively, the operator may choose to monitor the pressure level inside the generator 12 and purposes herein, the monitoring of pressure or purity may be used interchangeably. Typical values for $H_{pref}$ are between 90% and 99% with a desired $H_{pref}$ of 98%. A higher value of $H_{pref}$ will typically result in greater hydrogen usage. If the answer to query block 66 is negative, the method 60 returns to block 64 where the hydrogen gas is again sampled and measured. This loop continues generally until method 60 is externally terminated or paused, or until the query of block 66 is answered affirmatively.

If the answer to the query of block 66 is affirmative, either in the first instance or after one or more negative answers, the method 60 proceeds to block 68 where a control signal is passed from purity monitor 18 to the valve 20 causing the valve 20 to open. The opening of the valve 20 allows gas from the generator 12 to be vented to the atmosphere.

The method 60 then proceeds on to block 70 to produce hydrogen gas. Generally, the hydrogen generator 24 will detect the pressure drop at sensor 30 that results from the venting of the generator 12 which occurred in block 68. Typically, upon detection of this drop in pressure below the desired pressure $P_{des}$ the hydrogen generator 24 will initiate production of hydrogen gas which is transferred to the generator 12.

The method 60 then continues on to block 72 where the gas from the generator 12 is sampled and the hydrogen purity measured. Method 60 then proceeds on to query block 74 where the $H_{pure}$ is compared with a desired level $H_{pref}$. If the query answers affirmative, the method 60 loops back to block 72 and continue to monitor the hydrogen purity $H_{pure}$ in the generator 12. This loop continues generally until method 60 is externally terminated or paused, or until the query of block 74 is answered negatively.

If the answer to the query in block 74 is negative, this is indicative that the purity level of the hydrogen gas in the generator has reached a level desired by the operator. The method 60 then proceeds on to block 76 where a control signal is passed from the purity monitor 18 to the valve 20. The valve 20 closes and the venting of gas from the generator 12 stops. Method 60 then proceeds on to block 78 where hydrogen production ceases. In the preferred embodiment, when the valve 20 is closed, the pressure will rise in the generator. This pressure rise will be detected in the sensor 30, and when the pressure in the generator reaches the desired pressure $P_{des}$ the hydrogen generator 24 stops production of hydrogen gas. Typically, the desired pressure $P_{des}$ is between 30 psi and 75 psi. Method 60 then continues back to block 64 to start the process again. It will be appreciated that method 60 is performed repetitively during the operation of the system 10.

Figure 6:
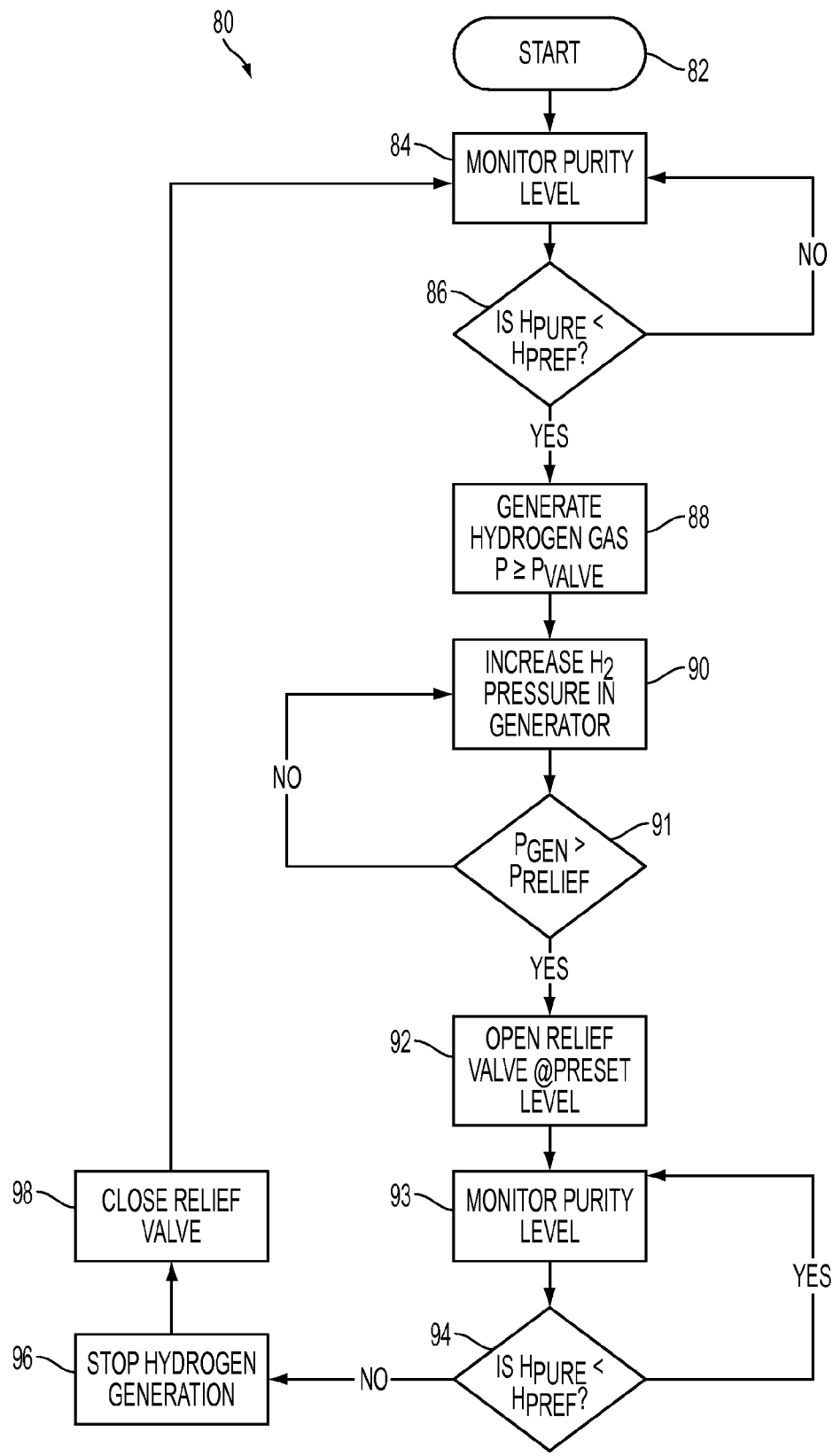
FIG. 6 is a block flow diagram illustrating the method of operating the system of FIG. 3.

Referring to FIGS. 3 and 6, an alternate electrical power generation control method 80 of FIG. 6 will now be described. After starting at block 82, method 80 proceeds to block 84 where the hydrogen purity level the $H_{pure}$ of the gas in the generator 12 is sampled measured. Method 80 then proceeds to query block 86 where the parameter $H_{pure}$ is compared with the desired purity level $H_{pref}$. If the query returns a negative response, the method 80 loops back to block 84 and the method continues until terminated or paused by the operator.

If the query block 86 returns an affirmative response, the method 80 continues on to block 88. In block 90, purity monitor 18 sends a control signal to the hydrogen generator 24 which causes the hydrogen generator 24 to initiate hydrogen production at a predetermined flow rate and pressure $P_{des}$. Typically, the desired pressure $P_{des}$ is between 30 psi and 75 psi, with a preferred pressure of 45 psi. In the preferred embodiment, the desired pressure $P_{des}$ is greater than the relief pressure $P_{relief}$ of valve 20.

After hydrogen gas production is initiated, the method 80 continues on to query block 91 where $P_{relief}$ and $P_{gen}$ are introduced into the following query:

Is $P_{gen} > P_{relief}$?

Here, the parameter $P_{gen}$ represents the pressure inside the generator 12 and the parameter $P_{relief}$ represents the pressure setting at which the valve 20 will open allowing the gas from the generator 12 to vent to the atmosphere. If the query in box 91 returns a negative, the method 80 loops back to box 90 and hydrogen continues to be generated and provided to the generator 12. The method 80 continues until terminated or paused by the operator.

If the query in box 91 returns an affirmative response, indicating that the pressure inside the generator has reaches a value greater than the relief setting on the valve 20, the method 80 continues on to box 92 and the valve 20 is opened. The method continues on to monitor the hydrogen purity level $H_{pure}$ in box 93 and compare the measured level with the desired purity level in box 94 in a similar manner as has been described herein above.

Once the purity of the hydrogen gas in the generator achieves the desired purity level, the method 80 continues on to block 96 where the purity monitor 18 transmits a control signal to the hydrogen generator 24 causing the hydrogen generator to cease production of hydrogen gas. Once the hydrogen generator stops producing gas, the method 80 continues on to box 98 where the valve 20 will close once the pressure in the generator drops below the predetermined threshold.

Method 80 then continues back to block 84 to start the process again. It will be appreciated that method 80 is performed repetitively during the operation of the system 10.

Figure 4:
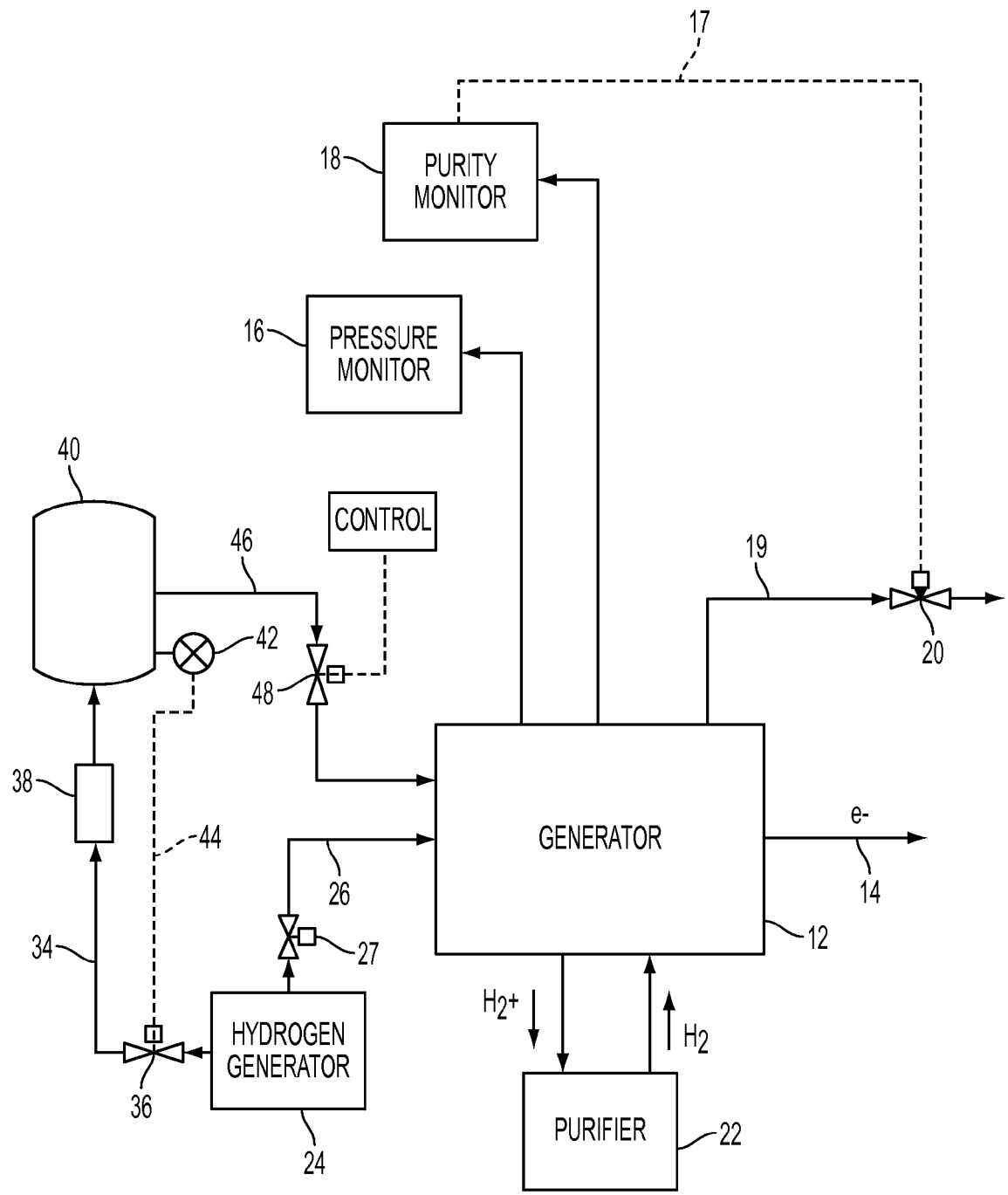
FIG. 4 is a schematic diagram illustrating an alternate embodiment hydrogen purity system with excess hydrogen storage of the present invention.
Figure 7:
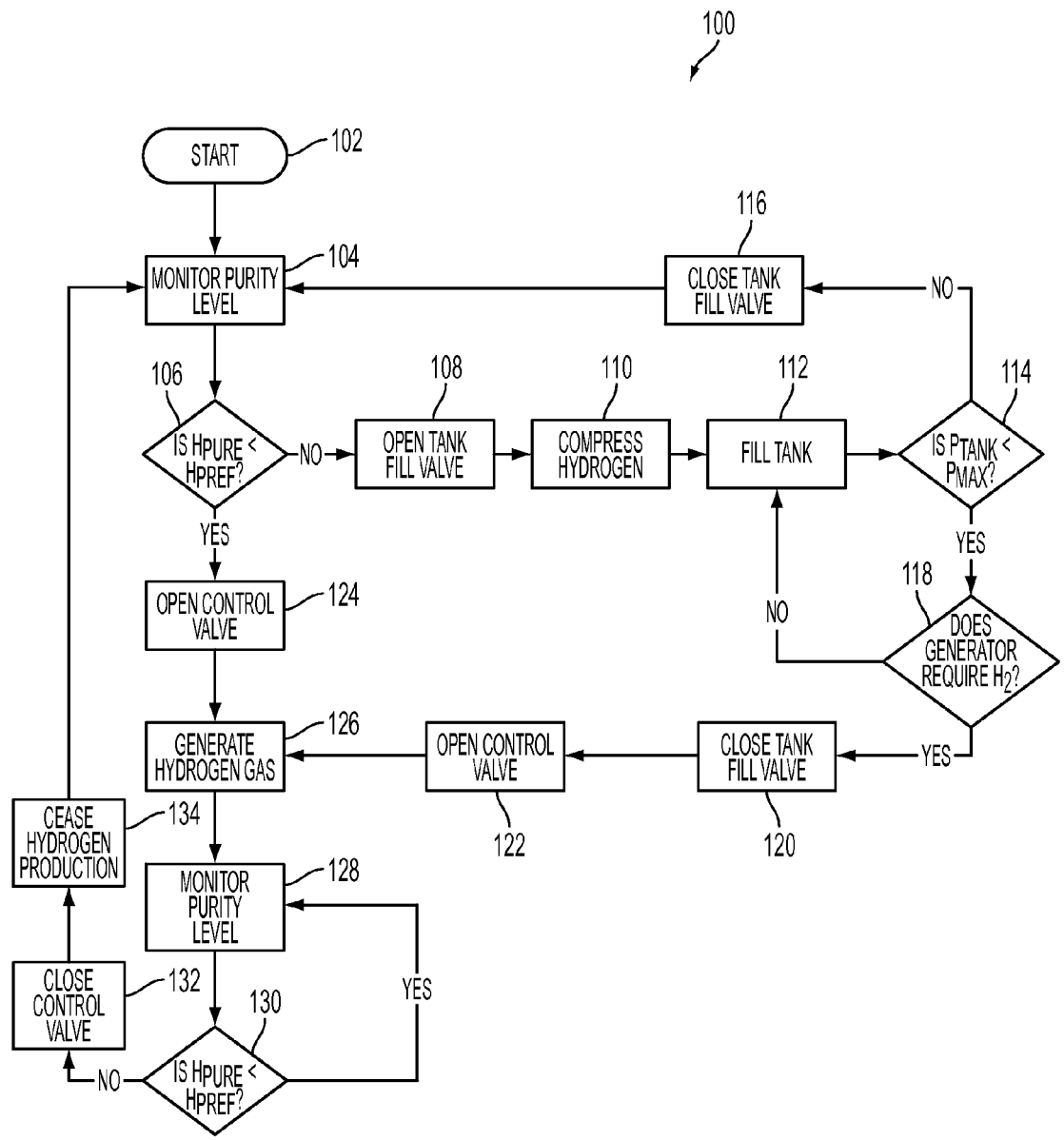
FIG. 7 is a block flow diagram illustrating the method of operating the system of FIG. 4.

Referring to FIGS. 4 and 7, an alternate electrical power generation control method 100 of FIG. 7 will now be described. After staffing at block 102, method 100 proceeds to block 104 where the hydrogen purity level the $H_{pure}$ of the gas in the generator 12 is measured. Method 100 then proceeds to query block 106 where the parameter $H_{pure}$ is compared with the desired purity level $H_{pref}$. If the query block 106 returns an affirmative response, the method 100 proceeds to block 124 where the vent valve 20 is opened and gas from the generator 12 is vented to the atmosphere. The method 100 then proceeds generate hydrogen gas in block 126. The purity level of the hydrogen gas in the generator 12 until query block 130 returns a negative response. The method 100 then proceeds to block 132 where the valve 20 is closed and the generation of hydrogen gas ceases in block 134. If the query block 106 returns a negative response, the method 100 proceeds on to block 108 which opens the valve 36 allowing hydrogen gas to flow from the hydrogen generator 24 towards the tank 40. The method 100 then optionally compresses the hydrogen gas in block 110 and proceeds to fill tank 40 In block 112.

While the tank 40 is filling, the method 100 monitors the pressure $P_{tank}$ in the tank 40. The tank 40 will also have a maximum working pressure rating $P_{max}$. Typically, the tank 40 will have a maximum pressure rating between 2000 psi and 10,000 psi, with a preferred rating of 2,400 psi. Method 100 proceeds to block 114 where $P_{tank}$ and $P_{max}$ are introduced into the following query:

Is $P_{tank} < P_{max}$?

If the query block 114 responds affirmatively, the method 100 proceeds query box 118 where the hydrogen purity level is compared to the desired level. If the query in block 114 returns a negative response, the process 100 closes the tank fill valve in block 116 before returning to monitor the hydrogen purity level in block 104. If the query block 118 returns a negative response, which would indicate that the generator required replenishment of pure hydrogen gas, the method 100 returns to block 112 in order to continue filling the tank with hydrogen. If the query in block 118 returns an affirmative response, the method 100 then proceeds on to block 120 where the valve 36 is closed and then onto block 122 where the vent valve 20 is opened and gas from the generator 12 is vented to the atmosphere. Method 100 then proceeds through blocks 126-134 to replenish the generator with hydrogen gas to the appropriate purity level in the same manner as was described herein above with respect to method 60 and blocks 72-78.

It should be appreciated that the process steps in blocks 128-134 may also be accomplished using the alternate method described with respect method 80. In addition, in applications where the hydrogen generator 24 is continuously producing gas for the generator 12, it is within the contemplation of this invention that the hydrogen generator 24 provides hydrogen gas to both the tank 40 and the generator 12 simultaneously with preference being given to supplying the generator 12.

Figure 10:
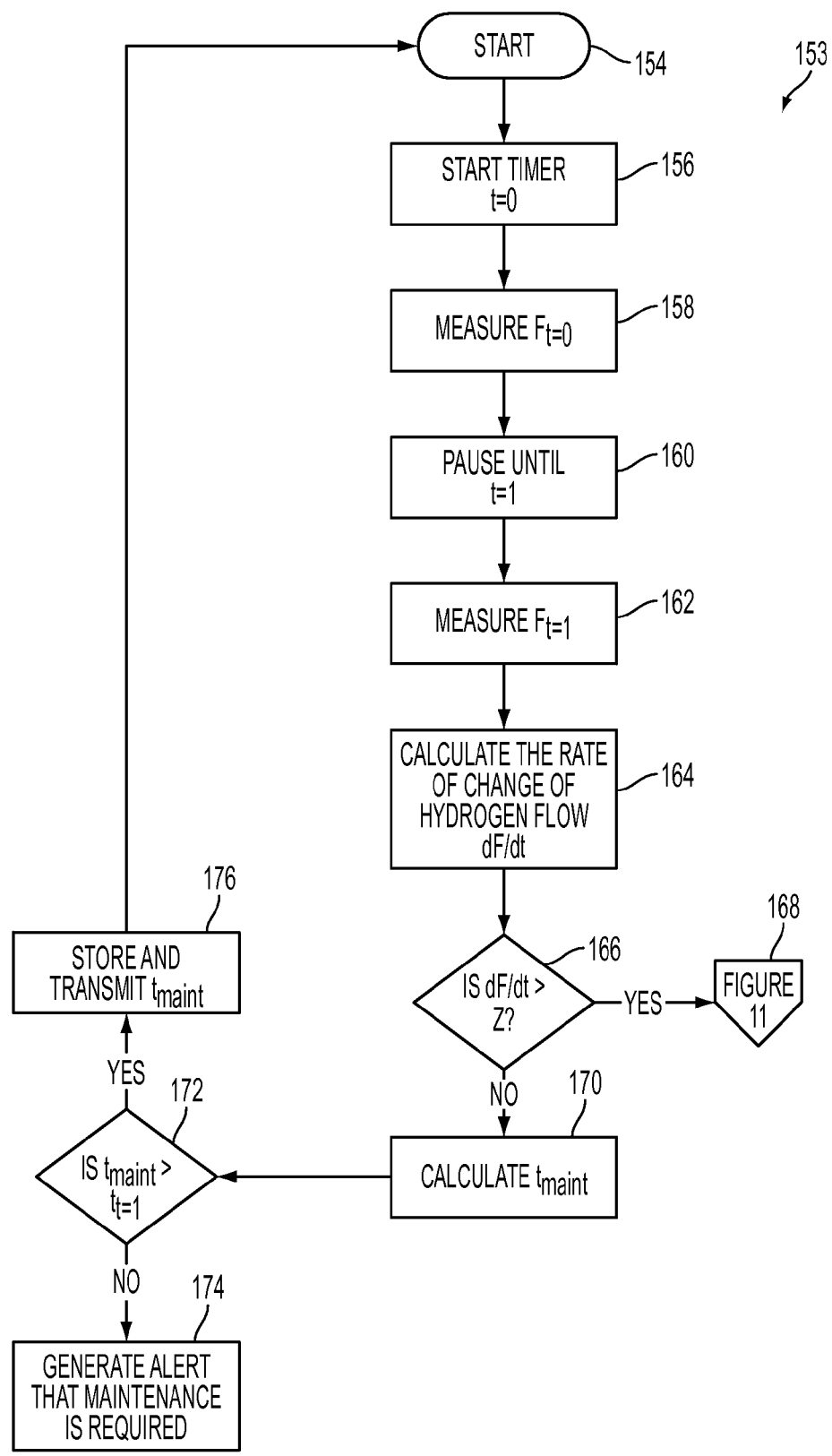
FIG. 10 is a block flow diagram illustrating the method of operating the system of FIG. 2 to determine the time remaining until preventative maintenance is required.
Figure 11:
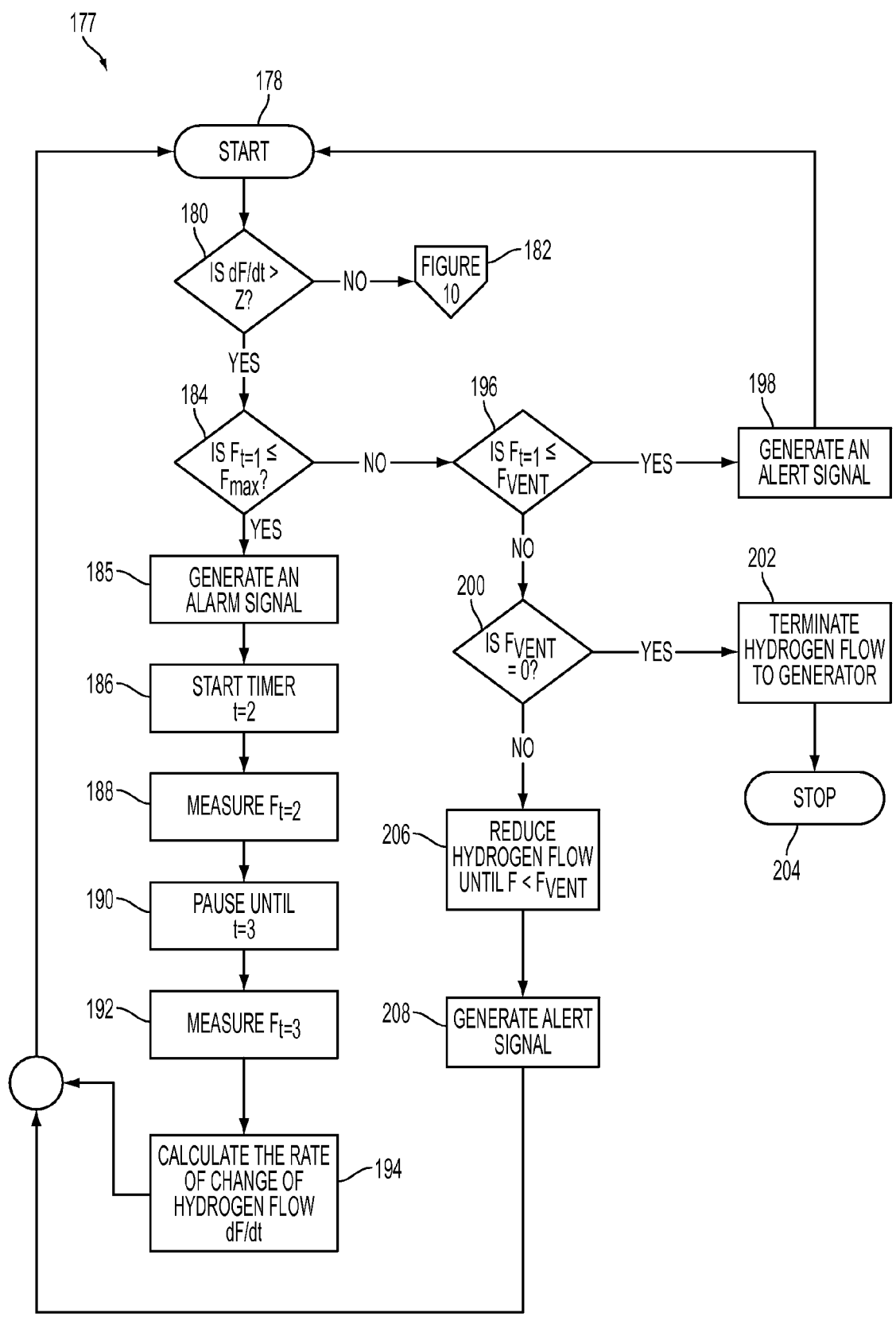
FIG. 11 is a block flow diagram illustrating the method of operating the system of FIG. 2 in the event of a major seal leak in the electrical generator.

Referring to FIGS. 10 and 11 an electrical power generating system control method 153 of FIG. 10 will now be described. Method 153 starts at block 154 and proceeds to block 156 where a timer is started at t=0. At block 158, the hydrogen flow $F_{t=0}$ is measured. The method 153 then proceeds to block 160 until timer reaches t=1 and the hydrogen flow $F_{t=1}$ is measured in block 162. The method 153 then proceeds to block 164 where the rate of change of the hydrogen flow dF/dt is calculated and compared with a predetermined value Z in block 166. The parameter Z represents a predetermined threshold that may indicate an increase in hydrogen flow beyond that desired by the operator, such as would be the case if a seal failed in generator 12.

If decision block 166 returns an affirmative response, meaning the hydrogen flow rate is greater than the parameter Z, the process transfers to block 168 as will be described with respect to FIG. 11 herein below. If decision block 166 returns a negative, the process 153 moves on to block 170 where the time to maintenance $t_{maint}$ is calculated based on the current trend of hydrogen flow rate. The process 153 then continues on to decision block 172 where $t_{maint}$ is compared with $t_t=1$ to determine if the time to maintenance has passed. Alternatively, decision block 172 may compare flow $F_{t=1}$ with $F_{maint}$ to determine if maintenance if past due. If preventative maintenance is indicated, the process continues to block 174 where an alert is generated and transmitted to the operator. If preventative maintenance is not indicated by decision block 172, the process continues on the block 176 where the hydrogen flow data is stored and the estimated time to maintenance $t_{maint}$ is transmitted to the operator. Process 153 then proceeds to loop back to start block 154 to continue monitoring hydrogen flow.

If decision block 166 indicates that the rate of change of hydrogen flow dF/dt is greater than a predetermined threshold Z, the process 153 proceeds to block 168 which transfers to process 177 shown FIG. 11. Process 177 begins in Start block 178 and confirms that the hydrogen flow rate dF/dt is greater that parameter Z. If decision block 180 returns a negative, the process proceeds to block 182 which loops back to process 153 shown in FIG. 10. If decision block 180 returns a positive result, the process moves on to decision block 184 where the hydrogen flow $F_t=1$ is compared with the predetermined maximum flow $F_{max}$.

If decision block 184 indicates a positive, meaning that the hydrogen flow $F_{t=1}$ is less than or equal to $F_{max}$, the process proceeds to block 185 were an alarm signal is generated alerting the operator to the condition. Process 177 then proceeds on to block 186 where a timer is started at $t_{t=2}$, and the hydrogen flow $F_{t=2}$ is measured in block 188. The process pauses until $t_t=3$ in block 190 and the hydrogen flow $F_{t=3}$ is measured in block 192. Process 177 then proceeds on to block 194 where the parameters $F_{t=2}$, $F_{t=3}$ are used to calculate a new rate of change of hydrogen flow dF/dt. The process 177 then loops back to Start block 178.

If decision block 184 indicates a negative, meaning that $F_{t=1}$ is greater than $F_{max}$, then process 177 proceeds to decision block 196 where the hydrogen flow parameter $F_{t=1}$ is compared with the ventilation flow $F_{vent}$ for the facility or enclosure that the generator system 10 is housed. The parameter $F_{vent}$ represents the ventilation flow through the room that is required to maintain a desirable operating point for the mixture of hydrogen with the air in the room where the generator system 10 is located. Typically, a sufficient flow is desired to maintain the hydrogen levels in the room at less than 50% of the lower flame limit (LEL) of hydrogen in air. It should be appreciated that the parameter $F_{vent}$ may be a predetermined fixed value based on the design of the facility, or the process 177 may communicate with a facility control system which monitors the operation of the heating and ventilation controls ("HVAC"). If communication between the HVAC monitoring system and process 177 is enabled, process 177 can adjust the hydrogen output of hydrogen generator 24 to maintain a desired operating environment.

If decision block 196 indicates a positive and $F_{t=1}$ is less than or equal to $F_{vent}$, process 177 proceeds to block 198 which generates an alert signal. Process 177 the loops back to Start block 178.

If decision block 196 indicates a negative, the process proceeds to decision block 200 which determines if $F_{vent}$ is equal to zero. Under this condition, there would be no ventilation in the facility housing the generator system 10 which may allow undesirable levels of hydrogen to build up in the facility due to the lack of ventilation. If decision block 200 indicates that the required ventilation is absent, the process proceeds to block 202 where hydrogen production in the hydrogen generator 24 is terminated and the process 177 is stopped in block 204.

If decision block 200 confirms that ventilation in the facility is operating, then the process 177 proceeds to block 206 where the hydrogen output of the hydrogen generator 24 is reduced until the hydrogen flow F is less than $F_{vent}$. An alert signal is generated in block 208 and process 177 loops back to Start block 178, While the invention has been described with reference to a preferred embodiment, it will be understood by those skilled in the art that various changes may be made and equivalents may be substituted for elements thereof without departing from the scope of the invention. In addition, may modifications may be made to adapt a particular situation or material to the teachings of the invention without departing from the essential scope thereof. Therefore, it is intended that the invention not be limited to the particular embodiment disclosed as the best mode contemplated for carrying out this invention.

What is claimed is:

1. A method for determining a hydrogen leak in an electrical generator comprising:
    measuring a first hydrogen flow rate into the electrical generator;
    measuring a second hydrogen flow rate out of the electrical generator;
    determining a first rate of change of hydrogen flow from said first and second hydrogen flow rates;
    generating a signal in response to said first rate of change of hydrogen flow exceeding a predetermined value; and,
    comparing said second hydrogen flow rate to a predetermined maximum flow rate.

2. The method for determining a hydrogen leak of claim 1 further comprising:
    measuring a ventilation flow rate of gas from said electrical generator; and,
    comparing said maximum flow rate to said ventilation flow rate.

3. The method for determining a hydrogen leak of claim 2 further comprising:
    stopping the flow of hydrogen to said electrical generator if said maximum flow rate is greater than said ventilation flow rate.

4. The method for determining a hydrogen leak of claim 2 further comprising:

reducing the flow of hydrogen to be equal to or less than said ventilation flow rate if said maximum flow rate is greater than said ventilation flow rate.

5. The method for determining a hydrogen leak of claim 4 wherein the flow of hydrogen is reduced by limiting the current flow to an electrochemical cell reducing the output of a hydrogen generator.

6. A method for determining a preventative maintenance schedule in an electrical generator comprising:
   measuring a first hydrogen flow rate into the electrical generator;
   measuring a second hydrogen flow rate out of the electrical generator;
   determining a first rate of change of hydrogen flow from said first and second hydrogen flow rates; and,
   determining a first time value, said first time value representing the amount of time remaining until preventative maintenance is required;
   wherein said first time value is calculated from said first rate of change of hydrogen flow and a predetermined maintenance flow rate.

7. The method for determining a preventative maintenance schedule in an electrical generator of claim 6 further comprising:
   generating a time signal representative of said time remaining.

8. The method for determining a preventative maintenance schedule in an electrical generator of claim 7 further comprising:
   transmitting said time signal to a remote computer.

9. A method for determining a hydrogen leak in an electrical generator comprising:
   measuring a first hydrogen flow rate of hydrogen gas generated through the disassociation of water in an electrochemical cell;
   measuring a second hydrogen flow rate out of the electrical generator vent conduit;
   determining a differential of hydrogen flow from said first hydrogen flow rate and second hydrogen flow rates;
   determining a rate of change of said first hydrogen flow rate;
   generating a first signal when said rate of change of said first hydrogen flow rate is greater than a first predetermined value; and,
   generating a second signal if said hydrogen flow differential exceeds a second predetermined value.

10. The method for determining a hydrogen leak of claim 9 further comprising the steps of:
    measuring a ventilation flow rate for said electrical generator; and,
    comparing said differential hydrogen flow to said ventilation flow rate.

11. The method for determining a hydrogen leak of claim 10 further comprising:
    stopping the generation of hydrogen gas through the disassociation of water if said differential of hydrogen flow is greater than said ventilation flow rate.

12. The method for determining a hydrogen leak of claim 11 further comprising:
    reducing the amount of hydrogen gas generated through the disassociation of water to be equal to or less than said ventilation flow rate if said differential hydrogen flow is greater than said ventilation flow rate.

13. The method for determining a hydrogen leak of claim 12 wherein the flow of hydrogen gas generated through the disassociation of water is reduced by limiting the electrical current flow to an electrochemical cell.

14. A method for determining a hydrogen leak in an electrical generator comprising:
    measuring a first hydrogen flow rate into the electrical generator;
    measuring a second hydrogen flow rate out of the electrical generator;
    determining a rate in change of said first hydrogen flow rate;
    determining if said rate of change of said first hydrogen flow rate exceeds a first predetermined value;
    determining if said first hydrogen flow rate is less than a ventilation flow rate when said rate change of said first hydrogen flow rate exceeds said first predetermined value;
    determining if said ventilation flow rate is greater than a second predetermined value when said first hydrogen flow rate is less than said ventilation flow rate; and,
    reducing said first hydrogen flow rate to less than said ventilation flow rate when said ventilation flow rate is above said second predetermined value.

15. The method of claim 14 further comprising the step of reducing said first hydrogen flow rate to substantially zero when said ventilation flow rate is below said second predetermined value.

16. The method of claim 15 further comprising the step of generating a first signal in response to said first hydrogen flow rate being less than said ventilation flow rate when said rate of change in first hydrogen flow rate exceeds said first predetermined value.

17. The method of claim 16 further comprising the step of generating a second signal in response to said first hydrogen flow rate being reduced to substantially zero.

* * * * *